US010317205B2

(12) United States Patent
Gill (10) Patent No.: US 10,317,205 B2
(45) Date of Patent: Jun. 11, 2019

(54) DEPTH MEASUREMENT USING A PHASE GRATING (71) Applicant: Rambus Inc., Sunnyvale, CA (US)

(72) Inventor: Patrick R. Gill, Sunnyvale, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 15/548,745

(22) PCT Filed: Jan. 25, 2016

(86) PCT No.: PCT/US2016/014691
§ 371 (c)(1),
(2) Date: Aug. 3, 2017

(87) PCT Pub. No.: WO2016/137624
PCT Pub. Date: Sep. 1, 2016

(65) Prior Publication Data
US 2018/0031372 A1  Feb. 1, 2018

Related U.S. Application Data (60) Provisional application No. 62/120,279, filed on Feb. 24, 2015.

(51) Int. Cl.
G02B 27/10 (2006.01)
G01C 3/14 (2006.01)
(Continued)

(52) U.S. Cl.
CPC .......... *G01C 3/14* (2013.01); *G02B 27/1086* (2013.01); *G06T 7/593* (2017.01); *H04N 13/10* (2018.05); *H04N 13/271* (2018.05)

(58) Field of Classification Search
CPC .................. G02B 5/00; G02B 2005/1804; G02B 5/1842; G06T 7/593; G01C 3/14
(Continued)

(56) References Cited

U.S. PATENT DOCUMENTS 5,291,566 A * 3/1994 Harris .................. G02F 1/315
                                                     359/317
6,204,967 B1 * 3/2001 Morishima ........ G02B 27/2214
                                                     359/462

(Continued)

OTHER PUBLICATIONS

Garcia-Martinez et al., "Generation of Bessel Beam Arrays Through Dammann Gratings", Mar. 20, 2012, vol. 51, No. 9, Applied Optics. pp. 1375-1381. 7 Pages.

(Continued)

Primary Examiner — Isiaka O Akanbi
(74) Attorney, Agent, or Firm — Silicon Edge Law Group LLP; Arthur J. Behiel (57) ABSTRACT Binocular depth-perception systems use binary, phase-antisymmetric gratings to cast point-source responses onto an array of photosensitive pixels. The gratings and arrays can be manufactured to tight tolerances using well characterized and readily available integrated-circuit fabrication techniques, and can thus be made small, cost-effective, and efficient. The gratings produce point-source responses that are large relative to the pitch of the pixels, and that exhibit wide ranges of spatial frequencies and orientations. Such point-source responses make it easy to distinguish the point-source responses from fixed-pattern noise the results from spatial frequencies of structures that form the array.

11 Claims, 8 Drawing Sheets (51) Int. Cl.
   *G06T 7/593*     (2017.01)
   *H04N 13/271*    (2018.01)
   *H04N 13/10*     (2018.01)

(58) Field of Classification Search
   USPC .......................................................... 356/601
   See application file for complete search history.

(56) References Cited

U.S. PATENT DOCUMENTS

| | | | | |
|---|---|---|---|---|
| 6,509,559 | B1* | 1/2003 | Ulrich | G01B 11/25 |
| | | | | 250/237 G |
| 6,731,391 | B1* | 5/2004 | Kao | G01B 11/254 |
| | | | | 250/237 G |
| 8,922,636 | B1* | 12/2014 | Belden | G01P 5/001 |
| | | | | 348/77 |
| 2002/0131022 | A1* | 9/2002 | Shibatani | H04N 9/3108 |
| | | | | 353/31 |
| 2005/0083531 | A1 | 4/2005 | Millerd et al. | |
| 2006/0091300 | A1* | 5/2006 | Nishimura | G01J 3/02 |
| | | | | 250/226 |
| 2011/0090317 | A1* | 4/2011 | Su | G01B 11/002 |
| | | | | 348/49 |
| 2012/0307030 | A1* | 12/2012 | Blanquart | H01L 27/14601 |
| | | | | 348/76 |
| 2013/0062522 | A1* | 3/2013 | Jiang | H01L 27/14609 |
| | | | | 250/338.4 |
| 2014/0253781 | A1 | 9/2014 | Gill et al. | |
| 2015/0061065 | A1 | 3/2015 | Gill et al. | |

OTHER PUBLICATIONS

Gill, Patrick et al., "Lensless Ultra-Miniature Imagers Using Odd-Symmetry Spiral Phase Gratings", article presented at Computational Optical Sensing and Imaging (COSI), Arlington, Virginia, Jun. 23-27, 2013. 3 pages.

Gill, Patrick et al., "Lensless Ultra-Miniature Imagers Using Odd-Symmetry Spiral Phase Gratings", slide deck presented at Computational Optical Sensing and Imaging (COSI), Arlington, Virginia, Jun. 23-27, 2013. 18 pages.

Guerineau, N. et al., "Generation of Achromatic and Propagation-Invariant Spot Arrays by Use of Continuously Self-Imaging Gratings", vol. 26, No. 7, Apr. 1, 2001. 3 pages.

Horisaki, Ryoichi et al., "Regularized image Reconstruction for Continuously Self-Imaging Gratings", vol. 52, No. 16, Jun. 1, 2013. 10 pages.

Notification Concerning Transmittal of International Preliminary Report on Patentability dated Aug. 24, 2017 re: Int'l Appln. No. PCT/US2016/016837. 10 Pages.

Notification of Transmittal of the International Search Report and the Written Opinion of the International Searching Authority dated Apr. 22, 2016 re Int'l. Appln. No. PCT/US16/016837. 14 Pages.

Piponnier, Martin et al., "Relevance of Continuously Self-Imaging Gratings for Noise Robust Imagery", vol. 37 No. 17, Sep. 1, 2012. 3 pages.

\* cited by examiner

DEPTH MEASUREMENT USING A PHASE GRATING

BACKGROUND

The human perception of depth in a visual scene arises largely through the differences between the images observed by the left and right eyes. The term for this difference is "binocular disparity," and (together with accommodation cues) it is responsible for much of our acuity in determining the range to objects within approximately ten meters of us.

Several artificial approaches for determining the range to an object also involve the disparity signal between two or more well-aligned cameras (or captures from a moving camera—see below) or light sources. In these, typically one or more focusing lenses estimate the location of marker points, which may be intrinsic features of the scene (in the case of passive binocular disparity measurement) or may be high-texture patterns (often in near infrared) projected onto the scene. Accurate angular measurements of the scene yield information about the depth to an object. In some cases, a single moving camera can use data from different latencies to establish depth from disparity.

Binocular disparity sensors are not yet ubiquitous, in part due to their limited accuracy and their manufacturing complexity, especially the alignment and calibration needed to make accurate disparity measurements.

BRIEF DESCRIPTION OF THE DRAWINGS

The detailed description is illustrated by way of example, and not by way of limitation, in the figures of the accompanying drawings and in which like reference numerals refer to similar elements and in which.

DETAILED DESCRIPTION

Figure 1:
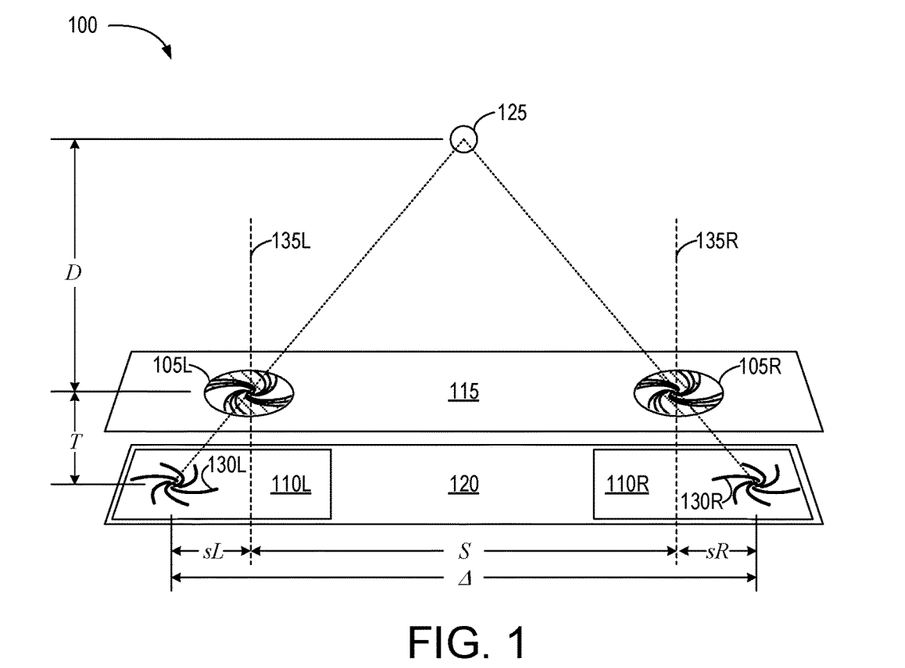
FIG. 1 depicts a binocular depth-perception system 100 in which a pair of optical elements 105L/R are integrated with underlying and corresponding photodetector arrays 110L/R.

FIG. 1 depicts a binocular depth-perception system 100 in which a pair of optical elements—binary, phase-antisymmetric gratings 105L/R in this example—are integrated with underlying and corresponding photodetector arrays 110L/R. System 100 can be manufactured to tight tolerances using well characterized and readily available integrated-circuit (IC) fabrication techniques, and can thus be made small, cost-effective, and efficient relative to focusing systems of comparable performance. The planar alignment and controlled spacing intrinsic to IC fabrication makes calibration and repeatability trivial compared to aligning multiple optical systems each with their own lenses and sensor dies.

Grating 105L/R are formed in an otherwise opaque layer 115, and are separated from underlying arrays 110L/R by a thickness T and from one another by an interpupil spacing S. System 100 can be made, for example, using photolithography techniques in which spacing S is controlled to within 200 nm. Thickness T and spacing S are constants that can be known with considerable precision, either due to manufacturing tolerances or by calibration. For illustrative purposes, an object 125 is shown separated from layer 115 by a depth D, which is the measurement of interest. Object 125 approximates a point source, and represents any object of interest in a scene.

Light from object 125 enters each grating 105L/R to produce respective left and right interference patterns 130L/R for capture by arrays 110L/R. (Arrays 110L/R can be parts of the same array.) Patterns 130L/R include near-field spatial modulations that cover ranges of spatial frequencies and orientations sufficient to locate the direction of object 125 at a desired resolution. Arrays 110L and 110R can be synchronized so as to minimize motion artifacts, and the pixel array orientation can be at some angle (such as 22.5 degrees) relative to the orientation of the inter-pupil spacing S in order to minimize effective measurement artifacts, as discussed in connection with FIG. 8.

The light from object 125 enters each grating at a different angle of incidence due to spacing S, and those angles shift patterns 130L/R by respective shifts sL and sR with respect to left and right optical axes 135L/R, which may serve as references. Depth D is easily calculated using the measured shifts sL and sR and constant spacing S and thickness T. To a first approximation, for an object 125 close to the optical axis of the system, depth D is the product of constants S and T divided by the sum of shifts sL and sR times the refractive index n of the medium separating layers 115 and 120. In equation form:

$$D = \frac{ST}{n(sL+sR)} \quad (1)$$

Alternatively, the sum of shifts sL and sR can be replaced with the separation Δ between patterns 130L/R less interpupillary spacing S, giving:

$$D = \frac{ST}{n(\Delta - S)} \qquad (2)$$

In this case, each of patterns 135L/R effectively serves as a reference for the other. More accurate measures can be made using e.g. Snell's law to account for the angle dependence of refraction through the layers of device 100.

Figure 2:
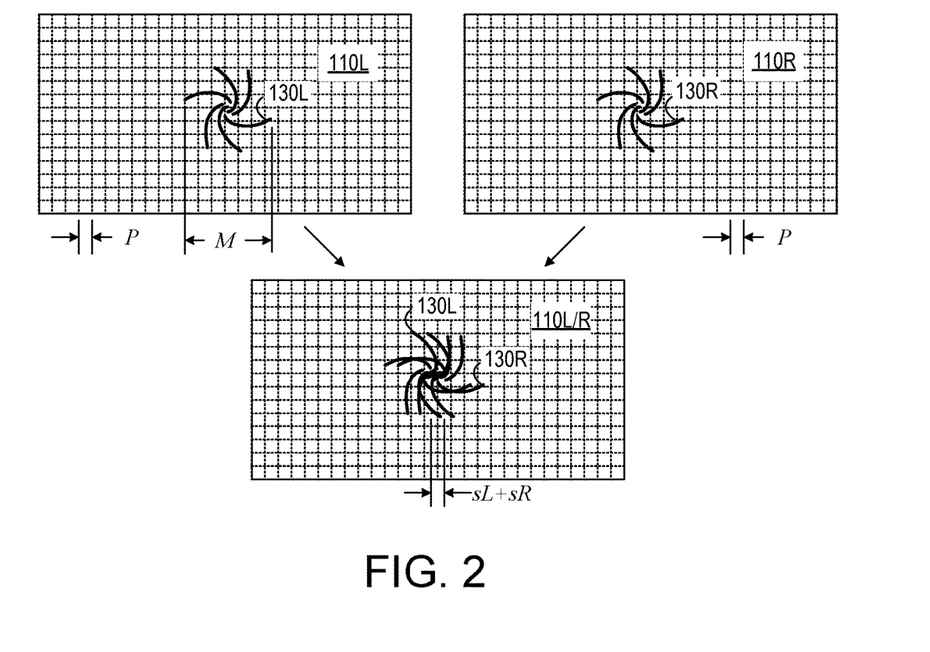
FIG. 2 is a plan view of arrays 110L/R with respective diffraction patterns 130L/R and arrays 110L/R overlaid to show their relative displacement and the sum sL+sR.

FIG. 2 is a plan view of arrays 110L/R with respective diffraction patterns 130L/R and arrays 110L/R overlaid to show their relative displacement and the sum sL+sR. Arrays 110L/R are identical in this embodiment, each with a pixel pitch P along the horizontal and vertical dimensions. (Pixels need not be square, in which case pitch P refers to the maximum pixel spacing.) Patterns 130L/R are considerably larger than pitch P, having a maximum response dimension M at least six times the pitch (M>6P). Small shifts impact a large number of pixels, and thus enable sub-pixel measurement precision.

Each pixel in a CMOS image sensor includes a photodetector that generates and stores charge responsive to light. The photodetector occupies only a portion of the area of each pixel, with much of the remaining area devoted to detection circuitry that samples and amplifies the stored charge to produce pixel-specific illumination data. Each pixel or small group of pixels additionally includes isolation boundaries and segments of conductors that extend between the rows and columns of photodetectors to communicate control signals and the illumination to circuitry outside the array. Viewed as a whole, a CMOS image sensor thus appears as a two-dimensional mosaic of photosensitive areas bounded by less sensitive or insensitive regions. Small shifts between adjacent pixels can therefore introduce measured intensity changes that are due to variations in pixel sensitivity rather than incident angle. CMOS processes give very precise lateral dimensions, so attributes of pixel geometry are very well specified for a given device. Pixels are thus regularly spaced by a known pitch and the pixel sub-elements are of regular and known shapes and sizes. The regular variations in pixel sensitivity thus combine across the array to produce noise that is band-limited to a known set of spatial-frequencies. Relatively large point-source responses make it easier to distinguish the signal of interest—the patterns—from this spatial noise. Treatment of such spatial noise is detailed below in connection with FIG. 8.

Figure 3:
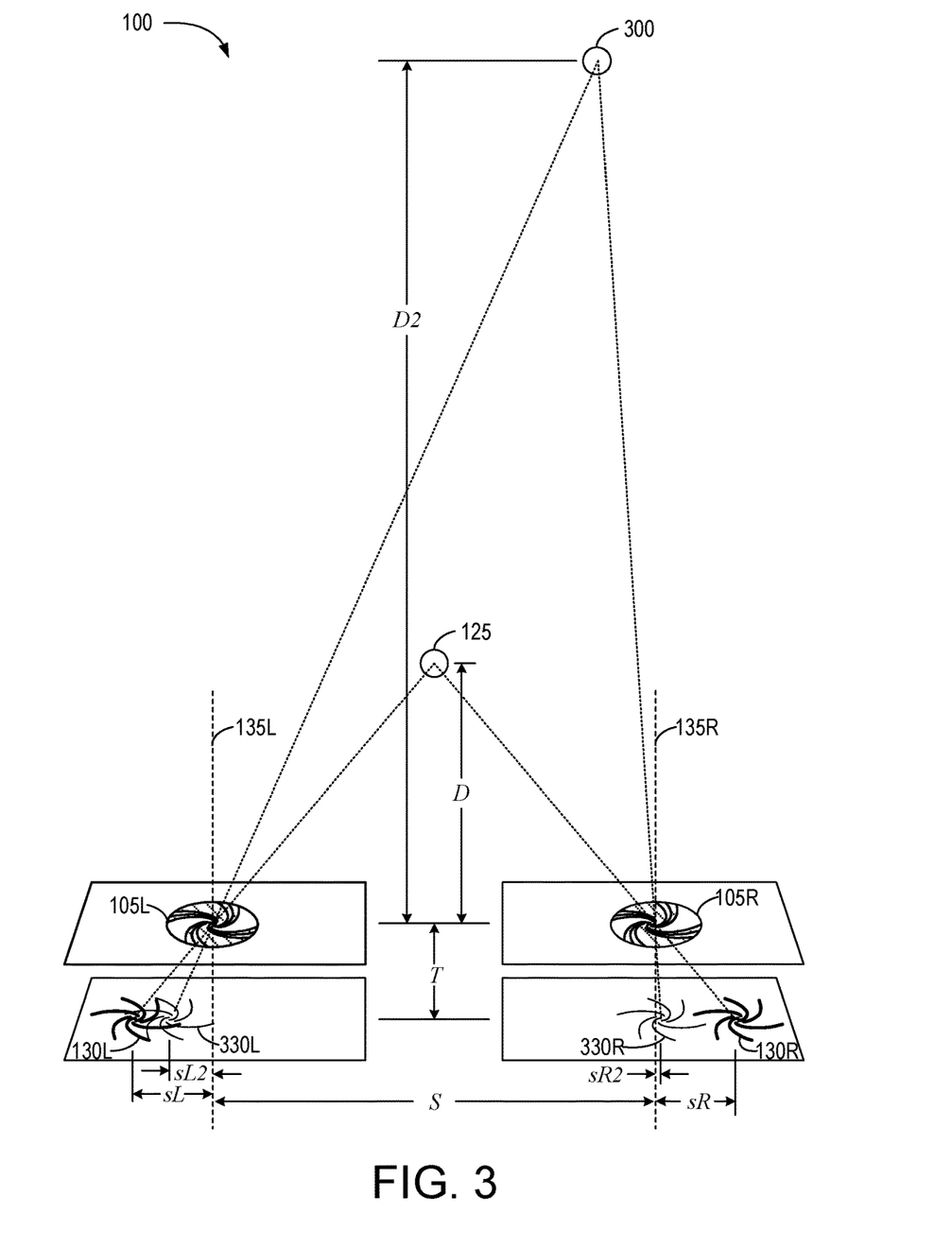
FIG. 3 depicts an imaging system 100 of FIG. 1 imaging a second object 300 to illustrate how system 100 can simultaneously measure different depths.

FIG. 3 depicts an imaging system 100 of FIG. 1 imaging a second, more-distant object 300 to illustrate how system 100 can simultaneously measure different depths. The treatment of object 125 is as detailed above in connection with FIG. 1. Object 300, a point source such as an LED or reflected beam, produces left and right interference patterns 330L/R with respective displacements sL2 and sR2. These displacements can be used with Equation (1) and constants S and T to calculate depth D2 from object 300 to the face of system 100. The gratings and underlying arrays are shown separately in FIG. 3 to emphasize that embodiments can employ physically separate sensors (e.g., to increase spacing S beyond what might be easily provided on a single substrate). For accurate range finding, the location of pattern 330L should be compared to that of pattern 330R and not pattern 130R; the problem of ascribing features on the two arrays correctly is known as the correspondence problem to those skilled in the art. The correspondence problem here can be solved noting that patterns 330L and 330R may be distinguished from patterns 130L and 130R from a difference in color, intensity, or polarization; sources 125 and 300 may be active at different times, or 330R and 330L can be displaced from 130 L and R in a direction perpendicular to S. In some embodiments with a small spacing S relative to the minimum range to objects in the scene, large displacements even exactly parallel to S can be ruled out.

Figure 4A:
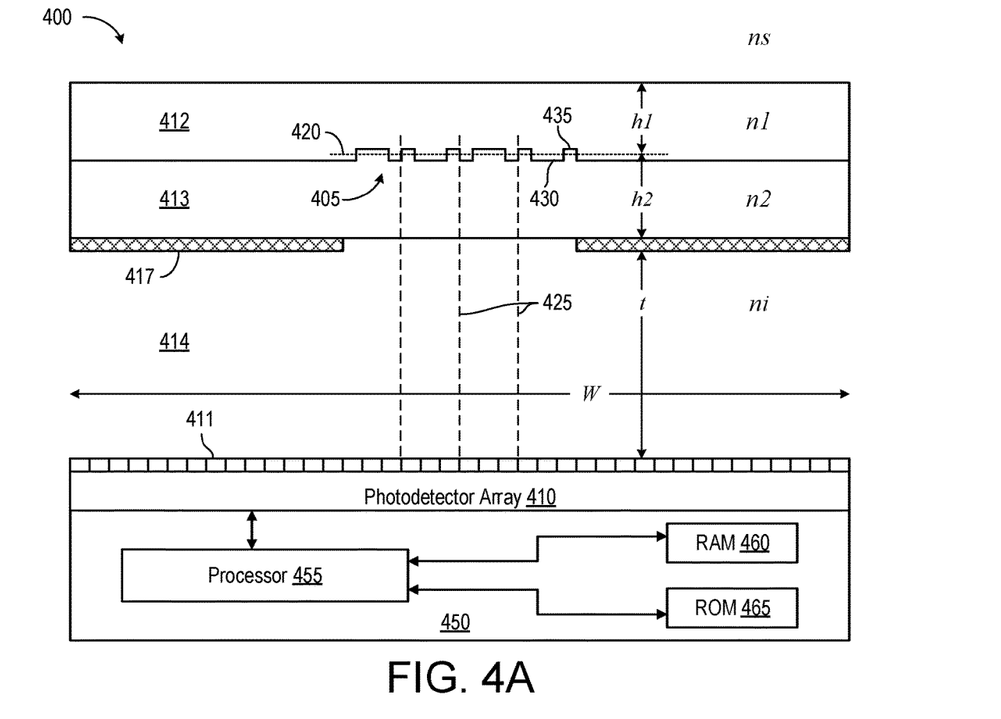
FIG. 4A is a cut-away view of an imaging device 400 with a binary, phase-antisymmetric grating 405 overlying a photodetector array 410.

FIG. 4A is a cut-away view of an imaging device 400 with a binary, phase-antisymmetric grating 405 overlying a photodetector array 410, such as a CCD (charge-coupled device), CMOS (complementary metal-oxide-semiconductor) or (in the case of thermal IR detection) a microbolometer sensor. Photodetector array 410 includes photoelements 411, and may additionally include a lenslet array that concentrates incident photons onto the most sensitive areas of array 410 to increase quantum efficiency. Grating 405 is formed by an interface between light-transmissive media of different refractive indices, a twenty-micron phase-shift layer 412 of UV-cured plastic and a twenty-micron layer 413 of thermoplastic with respective indices n1=1.41 and n2=1.61 in this example. Different combinations of indices can be used, and index n2 can be less than index n1. A space 414 with refractive index ni separates layer 413 from array 410. In this example, space 414 provides a separation t of about 145 microns and has a refractive index ni near one to match the refractive index ns of the medium through which light travels from objects in an imaged scene to device 400. For example, index ns might be air, in which case index ni would be close to one and the medium separating array 410 from the grating might be e.g. a gas or a vacuum. For aquatic or in vivo applications index ni might be closer to that of the fluid environment. In other embodiments where a wide angle of view is desirable while maintaining a small array 410, ni can be greater than ns and Snell's law corrections can be used to obtain an accurate measure of the incident angle of the arriving light, and hence the depth to the object of interest.

Grating 405 produces an interference pattern that is sampled by array 410. Image information can then be extracted from the pattern. Device 400 is constructed to produce raw image data of high fidelity to support efficient algorithms for precisely locating image features on array 410. Light from an imaged scene and in a wavelength band of interest strikes grating 405 from a direction that is normal to the plane 420 of grating 405. Unless otherwise stated, the wavelength band of interest is the visible spectrum. Cameras developed for use in different applications can have different bands of interest.

Each of three boundaries of odd symmetry 425 is indicated using a vertical, dashed line. The higher features 435 of grating 405 induce phase retardations of half of one wavelength (π radians) relative to lower features 430. Features on either side of each boundary exhibit odd symmetry. With this arrangement, paired features induce respective phase delays that differ by approximately half a wavelength over the wavelength band of interest. Due to greater dispersion in layer 412 than in layer 413, the difference in the refractive indices of layer 412 and layer 413 is an increasing function of wavelength, facilitating a wider wavelength band of interest over which the phase delay is approximately π radians. These elements produce an interference pattern for capture by array 410. The features of grating 405 offer considerable insensitivity to the wavelength of incident light in the band of interest, and also to the spacing between grating 405 and photodetector array 410.

Device 400 includes an optional opaque layer 417 patterned to include an aperture that encompasses or defines the effective limits of grating 405. In one embodiment the aperture is round and of a diameter of fifty-five microns. The aperture windows interference patterns, which tends to reduce edge effects that result from subsequent image-recovery algorithms. The aperture can also improve angle sensitivity and spurious light rejection, which can be advantageous for e.g. motion detection and measurement. Opaque layer 417 that forms the aperture can be applied directly to a layer forming grating 405, and may be coplanar or nearly coplanar with grating 405. Other embodiments omit the aperture, or may include an aperture spaced away from device 400 instead of or in addition to the aperture in layer 417. The dimensions of device 400 can vary considerably. In one embodiment, layers 412 and 413 are each about twenty microns; layer 417 is about 2,000 Angstroms with a round, fifty-five-micron aperture; and array 410 is a 200×200 array with a pixel pitch of 1.67 microns. To form a binocular depth sensor, two such devices can be included on a small die to support inter-pupillary separations on the order of millimeters or centimeters.

This example assumes light incident device 400 is normal to the plane of phase grating 405, in which case, by Huygens' principle, pairs of spherical wave re-radiators equidistant from a one of the boundaries of odd symmetry 425 cancel each other out due to the half-wavelength phase delay of the radiator on one side of the boundary 425 compared to the other. Thus, light of any wavelength in the band of interest destructively interferes to produce curtains of minimum intensity under boundaries 425. Neither the depth nor the wavelength of light over a substantial spectrum significantly influences this destructive interference. Constructive interference similarly produces foci of maximum intensity. Both the low and high features 430 and 435 admit light, which provides relatively high quantum efficiency relative to embodiments that selectively block light.

Device 400 can be integrated with or otherwise coupled to an integrated circuit (IC) 450 that supports image acquisition and processing. All the components of device 400 can be integrated into the same device or package using microfabrication techniques well known to those of skill in the art, or different components and features can be located elsewhere. In this example, IC 450 includes a processor 455, random-access memory (RAM) 460, and read-only memory (ROM) 465. ROM 465 can store parameters or lookup tables in support of image processing. Processor 455 captures digital image data from array 410 and uses that data with the stored PSF to compute e.g. depth measures as noted previously. Processor 455 uses RAM 460 to read and write data in support of image processing. Processor 455 may include SIMD instructions, butterflies accelerating the Cooley-Tukey FFT algorithm in hardware, and other specialized processing elements which aid fast, power-efficient Fourier- or spatial-domain operations.

Figure 4B:
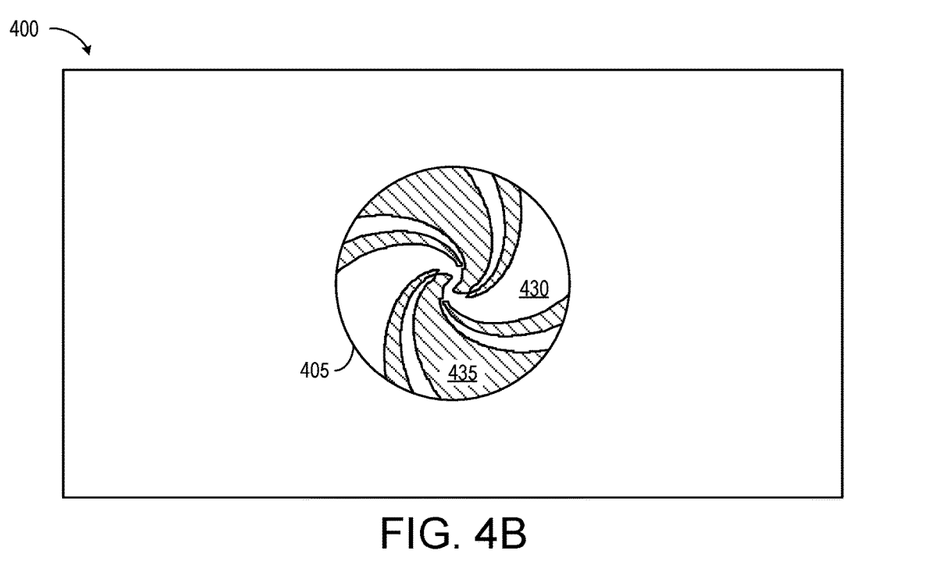
FIG. 4B is a plan view of an imaging device 400 of FIG. 4A in accordance with an embodiment in which grating 405 includes spiral features 430 and 435 to produce two-dimensional diffraction patterns.

FIG. 4B is a plan view of an imaging device 400 of FIG. 4A in accordance with an embodiment in which grating 405 includes spiral features 430 and 435 to produce two-dimensional diffraction patterns. Relatively narrow (wide) segment spacing works better for relatively high (low) frequencies of light, feature spacing increases along odd-symmetry boundaries (between elevated and recessed grating regions, represented by dark and light) with distance from the center. Curved boundaries of odd symmetry, defined between the elevated and recessed regions, extend radially from the center of the grating to the periphery, radiating out between the dark (elevated) and light (recessed) arms near the center.

In some embodiments, the functional form of the curved boundaries approximates a logarithmic spiral. The area of grating 405 can be greater than that of the aperture in layer 417 to provide alignment tolerance in manufacturing.

Although device 400 can include or be used with a focusing element (e.g., a lens), device 400 does not require a focusing element to produce images. Rather than focusing, as would be done by a traditional camera, device 400 captures a diffraction pattern that bears little resemblance to an imaged scene, but that is nevertheless interpretable by a computer. Grating 405 creates a certain point-spread function (PSF), a multi-armed thin spiral in this example, on the sensor array for every point of light in the imaged scene. The location of the center of the PSF is uniquely determined by the incident angle of light from the point source. Since faraway scenes can be thought of as collections of point sources of varying intensity, the sensed signals resemble a convolution of the PSF with the faraway scene. A scene can be computationally reconstructed from its corresponding interference pattern if there is a 1:1 map of scenes to sensor readings. In the case where the sensed signals are well approximated by a convolution with a fixed PSF, the Fourier components of the scene that are recoverable are the same as the Fourier components of the PSF with sufficient power to be observable above the noise sources in the system.

Figure 5:
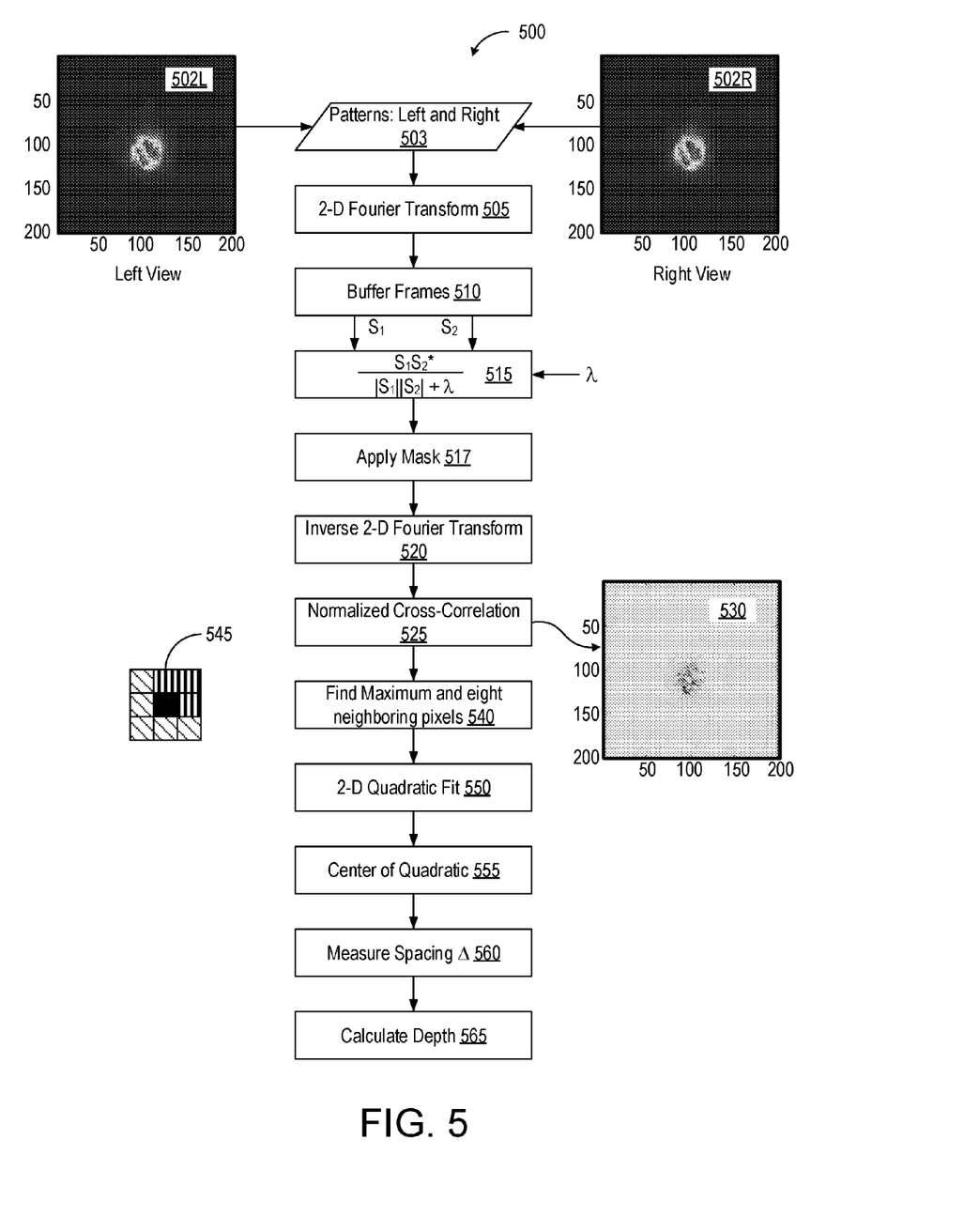
FIG. 5 is a flowchart 500 illustrating a method of measuring depth using e.g. system 100 of FIG. 1.

FIG. 5 is a flowchart 500 illustrating a method of measuring depth using e.g. system 100 of FIG. 1. This example assumes a point source imaged by a pair of 200×200 pixel arrays. To begin, left and right images 502L/R of the point source are captured (503). The left and right images may then be smoothly windowed so that their main contributions are predominantly from the point source of interest. Both images are then treated to a 2-D Fourier transform (505), and the resultant frequency-domain frames, $S_1$ and $S_2$, are buffered (510) in e.g. a frame buffer (not shown).

Next, frames $S_1$ and $S_2$ and a noise-dependent regularization factor $\lambda$ are used to calculate the Fourier transform of a normalized cross-correlation function (515). In this example, the product of $S_1$ and $S_2^*$, the complex conjugate of frequency domain frame $S_2$, is divided by the product of the absolute values of frequency domain frames $S_1$ and $S_2$ plus regularization factor $\lambda$. The regularization factor is selected to minimize the impact of spurious image artifacts and to de-emphasize spatial frequencies where $S_1$ and $S_2$ have low power relative to the noise in the system. This quotient can then be multiplied by a mask 517 removing frequencies known to be corrupted by the capture of a nonideal pixel array, as discussed below in connection with FIG. 8. The resultant function is then subjected to an inverse 2-D Fourier transform (520) to yield a cross correlation normalized by the autocorrelation of the scene (525).

Like each frame, the normalized cross-correlation of 525 is represented as a 2-D array of pixels 530. The brightest pixel or pixels can be identified as the peak correlation, corresponding to the scene shift between frames. Alternatively, a more accurate measure can take additional pixels into account. For example, a pixel representing a maximum intensity may be considered in concert with the neighboring eight pixels (540) to achieve sub-pixel spatial resolution. The process performs a 2-D quadratic fit (550) on the intensity values of the most-intense and neighboring eight pixels 545. When binocular disparity is known to lie along a direction parallel to the displacement S, i-D quadratic fits along section of the cross-correlation can be used. Knowing in advance the orientation of S along which to search for a correlation can dictate which elements of the correlation need not be computed to yield lower-power embodiments.

Whichever method is used, the fact that the point spread functions (diffraction patterns) are spread out over dozens of pixels means that the cross-correlation peak is based on data from dozens of observations, and is thus much more accurate than for a focused point-source image. The cross-correlation is then calculated to be the center of the resulting quadratic (555). The spacing between the two centers, separation Δ of FIG. 1, is computed (560), and the result plugged into e.g. Equation (2) to compute depth D (565). Especially when ni of FIG. 4A is not equal to ns, further refinements taking into account the location of the center of each source can be used in conjunction with Snell's law to compute location and range more accurately. One way to accomplish this is to substitute image 502R with the stored image of a point source normal to the grating when estimating the shift in image 502L, and to substitute image 502L with the same normal point source image when estimating the shift in image 502R. Then, the incident angles at both sensors can be computed from Snell's law and the range can be estimated. In a similar manner, to measure just the azimuth and elevation (but not the range) of a light source with known point spread function, a single sensor's output can suffice.

The foregoing procedure is illustrative, and other methods can be used to extract useful information from captured diffraction patterns. In an alternative method of calculating the normalized cross-correlation of frames $S_1$ and $S_2$, for example, the cross-correlation $S_1S_2^*$ can be normalized by dividing the cross-correlation by the square root of the product of the autocorrelations of $S_1$ and $S_2$. A regularization factor can be used as noted previously. The cross-correlation can be calculated in the spatial domain. This may be more computationally efficient when the expected depth can be limited to a small range of possibilities.

Images 502L/R are of interference patterns that may appear unintelligible to a human observer; however, because the gratings used to capture these images has sharp features in its point-spread function (PSF), images 502L/R contain information that can be used to mathematically reconstruct images in which objects appear in familiar forms. The PSF of the gratings, possibly in combination with the underlying array, can be known from a prior calibration or high-fidelity simulation. This information can be stored for later reconstruction. Alternatively, the spatial- or Fourier-domain deconvolution kernel needed to undo the effects of convolving with the PSF may be stored. Sampled patterns can then be deconvolved using e.g. spatial or Fourier deconvolution. In the example of FIG. 5, frames $S_1$ and $S_2$ can be deconvolved with the known PSF of the gratings and the depth-computation, beginning with cross-correlation function 515, carried out based on the resulting images. Alternatively, depth computations can be based on both frames $S_1$ and $S_2$ and their corresponding reconstructed images. It may be, for example, that a collection of point sources appears more distinct in one representation relative to the other.

In still other embodiments, the interference pattern(s) can be used for depth computation and reconstructed images provided for human viewing. For example, an imaging system could employ interference patterns to detect and locate a point source (e.g., a muzzle flash) in three-dimensional space and reconstruct an image of the scene to designate the point source to a human observer. In such embodiments the processing used to reconstruct images from interference patterns, and concomitant power use, can be limited to instances in which an image may be of use to a human observer.

Figure 6:
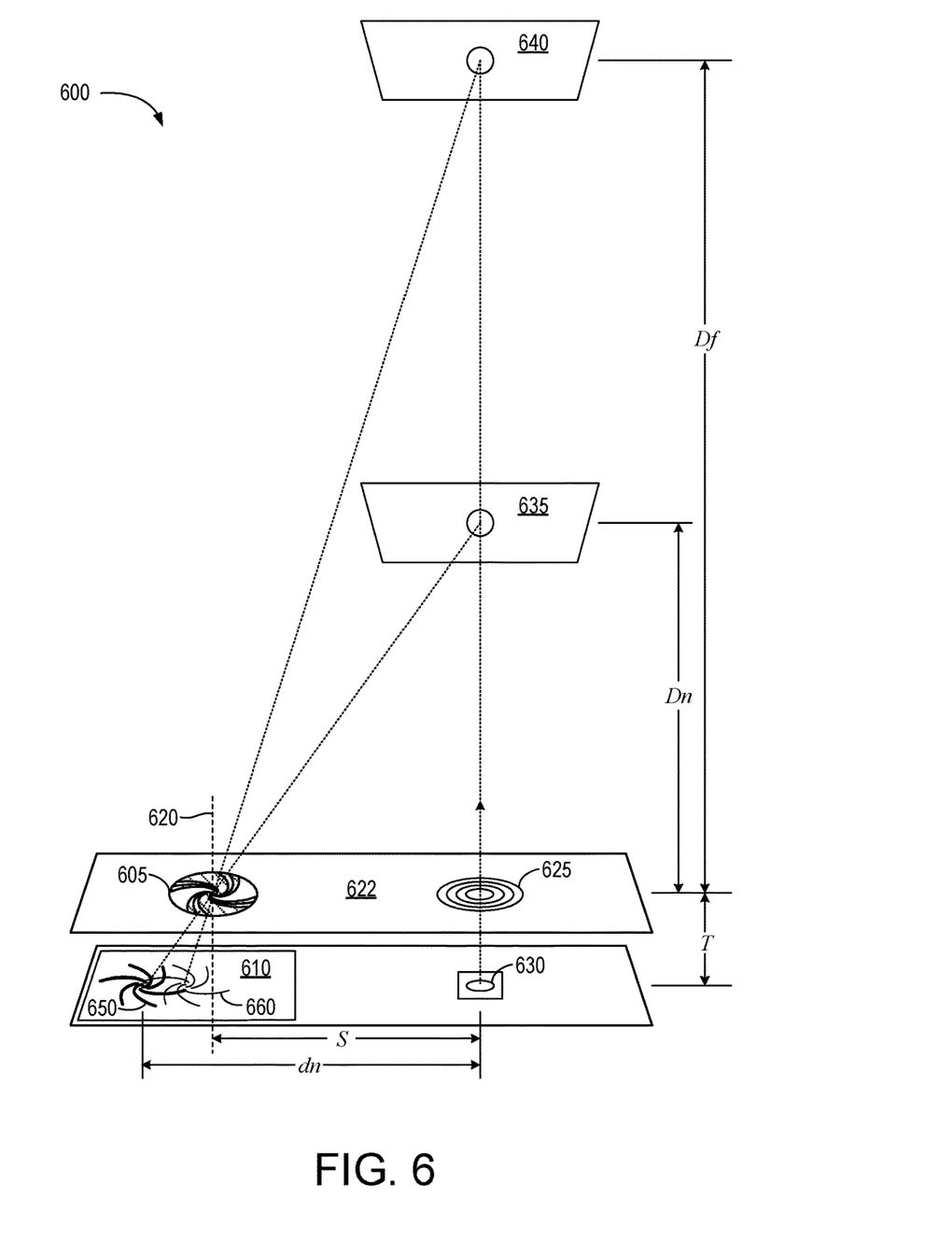
FIG. 6 depicts a depth-perception system 600 in accordance with another embodiment.

FIG. 6 depicts a depth-perception system 600 in accordance with another embodiment. System 600 includes but one imaging grating 605 instead of the pair used in system 100 of FIG. 1. An array 610 of photosensitive pixels captures diffraction patterns in the manner detailed previously measure an offset of an interference pattern 650 relative to an optical axis 620. Grating 605 is formed in an opaque layer 622 that also includes an optical element—a Fresnel zone plate 625—to columnate a beam transmitted from a light source 630. Zone plate 625 is positioned directly over light source 630 so that a beam projects upward, normal to layer 622. Including zone plate 625 improves manufacturing tolerance because lateral shifts of patterned layer 622 affect both the direction of the laser beam and optical axis 620 in a way that tends to cancel the impact of the shift on distance measurements. The beam reflects off remote objects, a near object 635 and a far object 640 in this example.

Reflected light from object 635 enters grating 605 to produce an interference pattern 650 for capture by array 610. The axis of laser 630 serves as a reference location. The center of pattern 650 is spaced from this reference by a distance do that can be detected in the manner detailed in connection with FIG. 5 and used to calculate depth Dn to object 635. In particular, depth Dn can be computed using the following equation:

$$Dn = \frac{ST}{n(dn - S)} \quad (3)$$

where T is the separation between grating 605 and sensor array 610, n is the index of refraction between grating 605 and sensor array 610, and S is the spread between optical axis 620 and laser 630. The depth Df to a more distant object 640 can similarly be computed using its corresponding interference pattern 660.

The light source and related focusing element are integrated with grating 605 and array 610 in this embodiment, but can be located elsewhere. Further, a light source can be similarly integrated into system 100 of FIG. 1. A color filter matched to the illumination can allow the imaging system to reject much of the scene background, and the sharp point source from the light source and optics can be readily distinguished from most diffuse light sources. In some embodiments the illumination is polarized and the sensor equipped with a cross polarized filter, eliminating specular reflections of the light source, which optically appear to come from a different depth than the reflecting object.

In still other embodiments multiple point sources can be imaged to produce a corresponding number of interference patterns from which to calculate depths. The point source or sources can be luminous, reflective, or retro-reflective markers, such as those used in motion capture, or can be reflected beams from a laser used in concert with the images sensors. A far-field diffractive element, such as a Dammann grating, can be used to split a laser beam into a collection of beams to produce corresponding fiducial patterns as collections of reflected points. The light source can be mechanically scanned or translated through the scene to give range estimates of different scene elements at different times.

Figure 7:
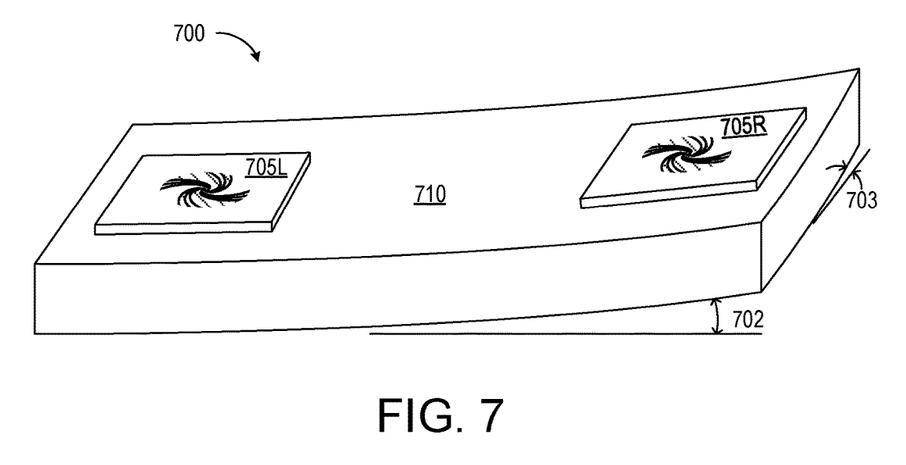
FIG. 7 depicts a system 700 that measure flexure—represented by an angle 702—and torsion—represented by an angle 703—in accordance with another embodiment.

FIG. 7 depicts a system 700 that measure flexure—represented by an angle 702—and torsion—represented by an angle 703—in accordance with another embodiment. System 700 includes a pair of image sensors 705L and 705R interconnected via a member 710 that is subject to bending, torsion, or both. Absent any flexion of member 710, images produced by sensors 705L/R will have a fixed offset equal to the spacing between the sensors. Twisting or bending member 710 introduces changes in their respective images that can be compared in the manner noted previously. Relative movement of the images can be used to compute the degree to which member 710 is bent or twisted. A point source, generated remotely or using an integrated light source, can serve as a reference. System 700 can also serve as a self-calibrating range finder of the type in system 100 using a far bright light source such as the Sun as the reference. In environments where a uniquely bright light source is far compared to S, system 700 can monitor its own flexure and subsequently compute the range to point sources (either with or without the presence of the uniquely bright source) accounting for the recently measured flexure.

Figure 8:
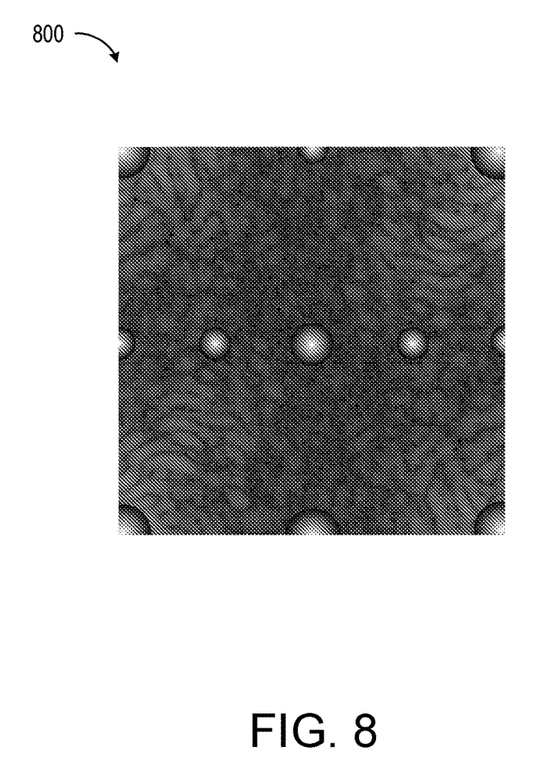
FIG. 8 is a plot 800 of the mean representation of the log magnitude of the Fourier power of an image of a point source taken using an image sensor of the type detailed in connection with FIGS. 2 and 3.

FIG. 8 is a plot 800 of the mean representation of the log magnitude of the Fourier power of an image of a point source taken using an image sensor of the type detailed in connection with FIGS. 2 and 3. The DC level is represented at the top left of plot 800, with the plot wrapping around. Five spots of relatively high intensity appear across the equator of plot 800, and others occupy the top, wrapping around to the bottom. These bright spots represent fixed-pattern noise that results from small differences in the individual responsivity of pixels in a sensor array that has a 2×4 pixel grouping structure. Different responsivity can be due to e.g. local post-amplification stages, color filter arrays, variations in the pixel size, material or interference with the local circuitry. Fixed-pattern noise can change with temperatures, exposure times, etc. The interference caused by non-ideal pixel arrays can be filtered digitally (as in the application of the mask 517 in FIG. 5), by orienting the pixel array at an angle relative to the separation S such that the orientation of the disparity signal will lie in a direction parallel to a line in Fourier space through the origin that avoids the interference caused by the non-ideal pixel array, or by a combination of these techniques.

Gratings of the type detailed herein produce patterns with a large spatial extent compared to a single pixel. The Fourier representation of the signals can therefore be filtered smoothly and with sufficient resolution to exclude known non-ideal spatial frequencies shown in plot 800, a feat not possible with the small point spread functions common in focusing optical systems. A filter can thus be applied to the Fourier power plot to remove the artifacts of fixed-point noise without overly impacting the signal of interest. Interference between the diffraction pattern and the pixel array that occurs at the spatial frequency of the pixel array itself (e.g. the incomplete fill factor of an array generates an alignment-dependent DC term) gets aliased to DC, which does not contain any spatial information and so needs not be filtered when angular comparisons such as depth measurement are the goal of the sensing system.

Figure 9:
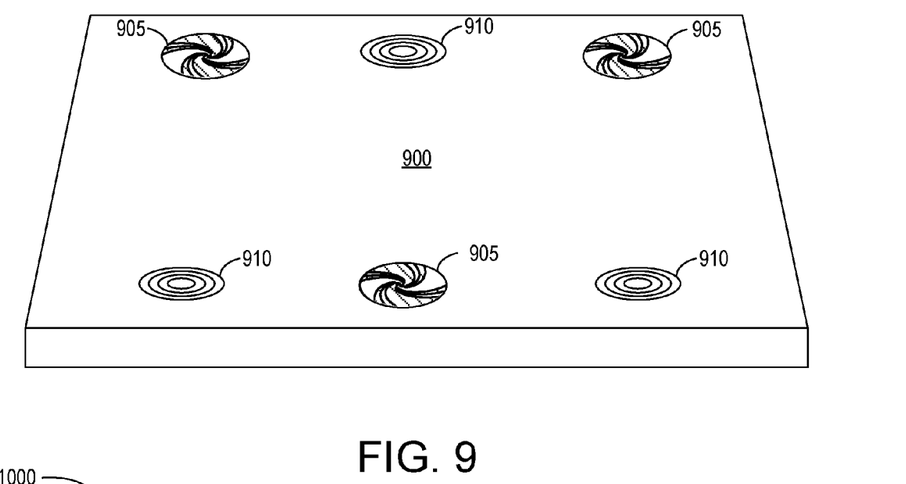
FIG. 9 depicts a depth-perception system 900 in accordance with an embodiment in which three gratings 905 are integrated with three light sources 910.

FIG. 9 depicts a depth-perception system 900 in accordance with an embodiment in which three gratings 905 are integrated with three light sources 910. In general, from one to N gratings can be used with from zero to M light sources to calculate depth. Distributing gratings and/or light sources in two dimensions can improve depth resolution.

Figure 10:
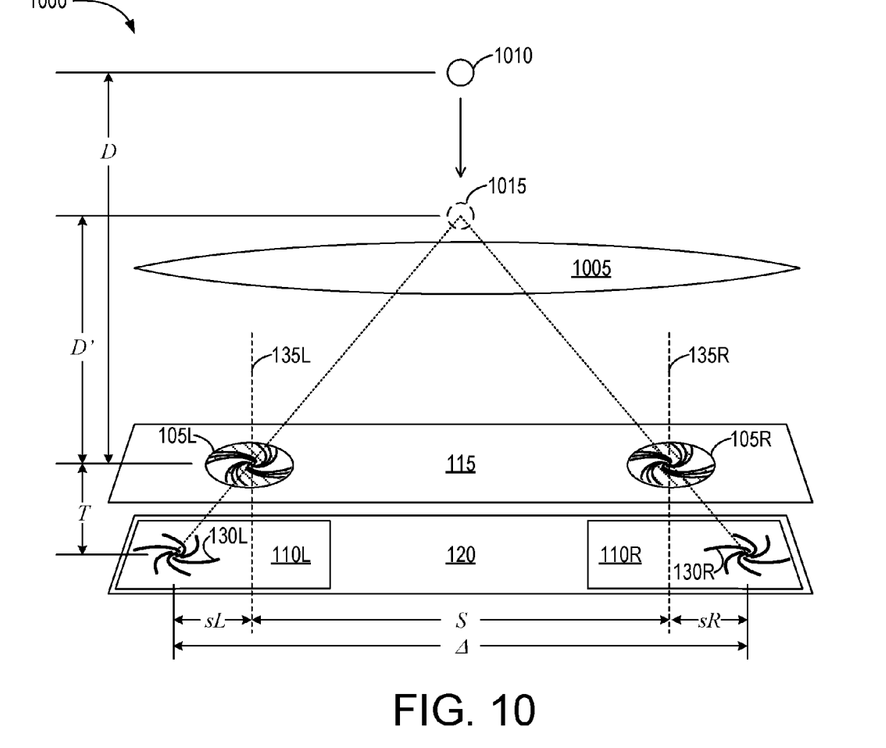
FIG. 10 depicts a binocular depth-perception system 1000 in accordance with another embodiment.

FIG. 10 depicts a binocular depth-perception system 1000 in accordance with another embodiment. System 1000 is similar to system 100 of FIG. 1, but includes a lens 1005 between the imaged object 1010 and gratings 105L/R. Lens 1005 optically moves the image of object 1010 at depth D to a point 1015 at depth D' closer to the gratings, which allows system 1000 to discriminate between depths farther from the sensors. Lens 1005 can be a focusing optic to enable system 1000 to measure a broad range of depths. Alternatively, systems can incorporate arrays of sensors with respective fixed-focus lenses of different focal lengths to collectively discriminate over broader ranges of depths.

Figure 11:
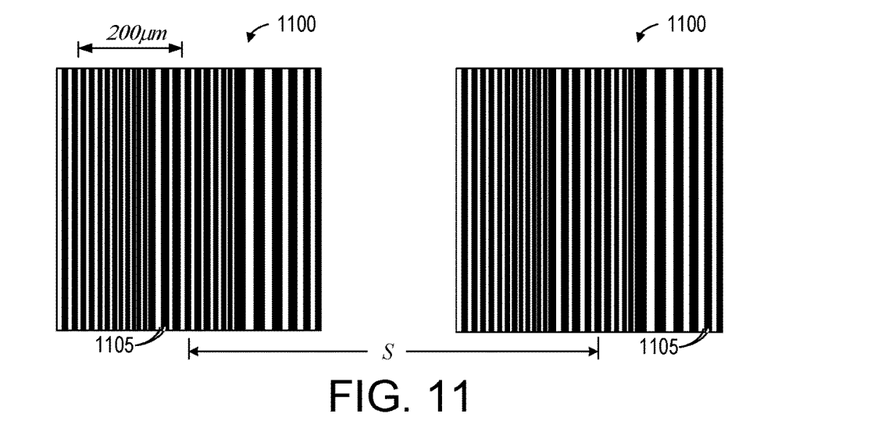
FIG. 11 depicts a pair of gratings 1100 in accordance with another embodiment.

FIG. 11 depicts a pair of gratings 1100 in accordance with another embodiment. Rather than features of varied orientations, gratings 1100 include aperiodically spaced linear features 1105 extending perpendicular to the displacement S between the gratings. The higher features 1105, shown in black, induce phase retardations of half of one wavelength ($\pi$ radians) relative to lower features, shown in white. These perpendicular features contribute more binocular disparity information than features of varied orientations.

Figure 12:
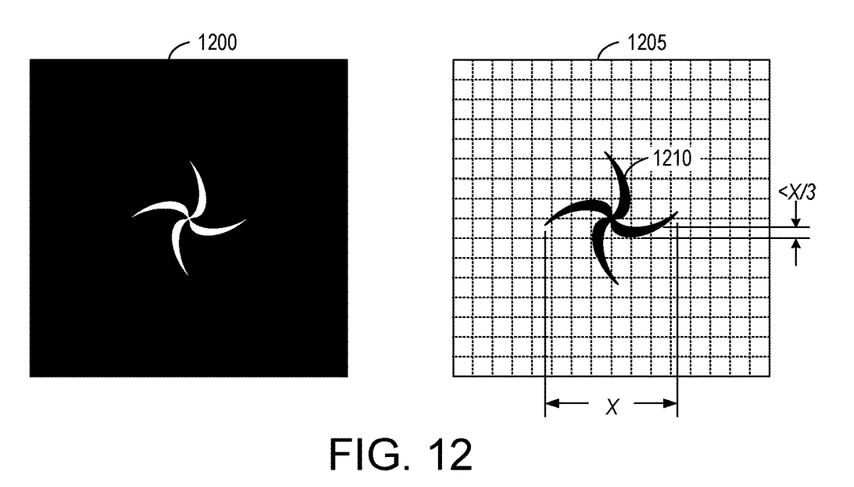
FIG. 12 depicts an aperture 1200 that produces a point-spread function (PSF) with a considerable range of spatial-frequency components relative to a round or relatively round aperture.

FIG. 12 depicts an aperture 1200 that produces a point-spread function (PSF) with a considerable range of spatial-frequency components relative to a round or relatively round aperture. A pixel array 1205 shows an illuminated pattern 1210, a point-source response produced by passing light through aperture 1200. (Pattern 1210 is shown as a dark feature for ease of viewing, but would appear as a bright pattern against a dark background.) Pattern 1210 has a maximum dimension X greater than six times the pixel pitch P, and has features with dimensions less than a third the maximum dimension. A Fourier representation of pattern 1210 includes information widely distributed in the Fourier space, which provides advantages similar to those discussed in connection with FIG. 8. For example, a simple filter can be applied to the Fourier power plot of the imaged pattern 1210 to remove the artifacts of the non-ideal pixel array without overly impacting the signal of interest. This benefit is not limited to use in depth sensing, but is more broadly applicable to system in which the location of a point source is of interest.

Figure 13:
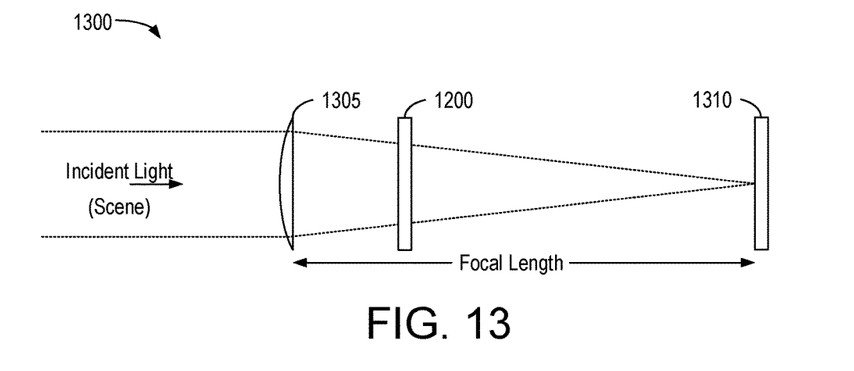
FIG. 13 depicts an imaging system 1300 that incorporates aperture 1200 of FIG. 12 between a focusing optic 1305 and an image sensor 1310.

FIG. 13 depicts an imaging system 1300 that incorporates aperture 1200 of FIG. 12 between a focusing optic 1305 and an image sensor 1310.

Some applications of imaging system 100 and its variants include tracking landmark near infrared LEDs in virtual reality or augmented reality headsets, locating headlights of oncoming traffic (e.g. to avoid projecting high-beam headlights into oncoming drivers' eyes), and range-finding obstacle-avoidance and soft-landing systems for automated and/or unmanned aerial vehicles. In one example, one or more imaging systems 100 is placed on an automobile with automatically controlled headlights comprising a set of LEDs that can individually be switched or adjusted. A microcontroller monitors image information output by the imaging system using techniques such as those detailed in connection with FIG. 5 to identify and locate headlights of oncoming traffic. That information is then used to dim, aim, or disable those LEDs whose output is aimed at the eyes of drivers in oncoming traffic. In another example, imaging system 600 of FIG. 6 is mounted on the bottom of an automated and/or unmanned aerial vehicle. The system projects a small dot onto the ground below and, through techniques outlined in FIG. 5, estimates the range to the ground, facilitating ground avoidance in some cases, and a soft landing in others where the target vertical velocity decreases as the vehicle approaches the ground.

While the subject matter has been described in connection with specific embodiments, other embodiments are also envisioned. For example; while each grating detailed previously may be used in connection with photoreceptors to collect incident light, gratings in accordance with these and other embodiments can be used more generally in imaging devices that project images using photoelements that admit light; the wavelength band of interest can be broader or narrower than the visible spectrum, may be wholly or partially outside the visible spectrum, and may be discontinuous; cameras and gratings detailed herein can be adapted for use in multi-aperture or programmable-aperture applications; and imaging devices that employ other types of gratings can benefit by application of methods disclosed herein. Imaging systems of the type detailed herein can also sense lateral motion or looming. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A method of measuring a depth to an object in a scene, the method comprising:
    receiving light in a wavelength band of interest from the scene at a phase grating, the phase grating inducing near-field spatial modulations producing a diffraction pattern;
    capturing an image of the diffraction pattern induced by the phase grating;
    computing a disparity between the image of the diffraction pattern induced by the near-field spatial modulations and a reference; and
    estimating the depth to the object based on the disparity between the image of the diffraction pattern induced by the near-field spatial modulations and the reference.

2. The method of claim 1, wherein the phase grating is a first phase grating, the method further comprising:
    receiving the light from the scene at a second phase grating, the second phase grating inducing second near-field spatial modulations producing a second diffraction pattern;
    capturing a second image of the second diffraction pattern; and
    using the second image as the reference.

3. The method of claim 2, wherein estimating the depth comprises computing a distance between the image and the second image.

4. The method of claim 1, further comprising shining a laser source of the light on the object.

5. The method of claim 4, further comprising filtering out second light outside the wavelength band of interest.

6. The method of claim 5, wherein the filtering uses at least one of a color filter and a cross-polarized filter.

7. The method of claim 1, wherein capturing the image comprises sampling the diffraction pattern with an array of pixels of a pixel pitch.

8. The method of claim 7, wherein computing the disparity comprises measuring a lateral shift of the diffraction pattern on the pixels.

9. A method of measuring a depth to an object in a scene, the method comprising:
    receiving light in a wavelength band of interest from the scene at a phase grating, the phase grating inducing near-field spatial modulations producing a diffraction pattern;
    capturing an image of the diffraction pattern;
    computing a disparity between the image and a reference; and
    estimating the depth to the object based on the disparity;
    wherein capturing the image comprises sampling the diffraction pattern with an array of pixels of a pixel pitch; and
    wherein the diffraction pattern produces a point-source response with a maximum dimension of at least six times the pixel pitch on the array of pixels and features with smaller dimensions less than a third the maximum dimension.

10. The method of claim 9, wherein the image includes band-limited noise at spatial frequencies that correspond to known attributes of the array of pixels, the method further comprising filtering out the band-limited noise at those frequencies.

11. The method of claim 10, wherein computing the disparity comprises computing a Fourier cross-correlation of the captured image.

* * * * *